United States Patent [19]
Grantham

[11] 3,986,598
[45] Oct. 19, 1976

[54] LINEN PIECE ITEM SEPARATOR AND COUNTER

[76] Inventor: Charles R. Grantham, 3308 Descanso Drive, Los Angeles, Calif. 90026

[22] Filed: Apr. 5, 1974

[21] Appl. No.: 458,312

[52] U.S. Cl. .............................. 198/445; 93/93 C; 198/606; 271/34; 271/121; 198/622; 198/461; 198/503
[51] Int. Cl.² ...................................... B65G 43/00
[58] Field of Search ................ 271/10, 121, 34, 35; 93/93 C; 198/40, 287, 102, 62, 53

[56] References Cited
UNITED STATES PATENTS

| | | | |
|---|---|---|---|
| 2,602,535 | 7/1952 | Bird ..................................... | 198/40 |
| 2,615,556 | 10/1952 | Hoopes et al. ..................... | 198/53 R |
| 3,703,952 | 11/1972 | Kuhn ................................. | 198/102 |

FOREIGN PATENTS OR APPLICATIONS

| | | | |
|---|---|---|---|
| 1,556,092 | 2/1967 | Germany ........................... | 198/287 |

*Primary Examiner*—John J. Love
*Assistant Examiner*—Douglas D. Watts
*Attorney, Agent, or Firm*—Wofford, Felsman, Fails & Zobal

[57] ABSTRACT

The specification discloses an apparatus for separating and counting cloth piece items such as shop towels, diapers, napkins, massage towels, etc. The apparatus comprises a mechanical separator including steeply inclined conveyor means having a plurality of lanes of pegs for separating the piece items from a batch or load into a plurality of different lanes or channels; a sensor or detector for each lane for sensing individual piece items in the lanes; and a counter for counting the total number of piece items sensed by all of the sensors.

In the preferred embodiment, the separator comprises a forward and rearward steeply inclined conveyor, each including endless belt means having a plurality of lanes of spaced pegs driven upward and an oppositely driven finned roller located above each conveyor. The sensors are located at the crest of the rearward conveyor for detecting individual piece items in each of its lanes. The forward conveyor picks up piece items from a batch load with its lanes of pegs and separates the piece items in each lane. It then deposits the individual piece items on the rearward conveyor which operates to insure complete separation and conveys the separated piece items in each of its lanes past the sensors for detection.

13 Claims, 10 Drawing Figures

LINEN PIECE ITEM SEPARATOR AND COUNTER

BACKGROUND OF THE INVENTION

This invention relates to a piece item separator and counter for separating a batch of cloth piece items into a plurality of separate lanes to allow effective counting and summing of the total number of piece items in the batch.

In the linen supply industry, which rents and cleans piece items such as shop towels, diapers, napkins, massage towels, etc., a need has existed for a system for rapidly separating and counting the soiled piece items which are returned in bulk. In prior techniques, the piece items have been separated by hand and placed on a conveyor for counting one at a time, by an electric eye. This separating and counting process is slow, and hence has disadvantages when used in large establishments which handle large quantities of piece items.

SUMMARY OF THE INVENTION

It is an object of the present invention to provide a separating and counting system for rapidly separating and counting a load of piece items such as shop towels, diapers, napkins, massage towels, etc.

The system comprises a mechanical separator including steeply inclined conveyor means having a plurality of lanes of pegs for separating the piece items from a batch or load into a plurality of different lanes or channels; a sensor or detector for each lane for sensing individual piece items in the lanes; and a counter coupled to each of the sensors for counting the total number of piece items sensed by all of the sensors.

In one aspect, the conveyor means comprises a steeply inclined conveyor comprising endless belt means supported to travel around upper and lower spaced rotatable means disposed such that their axes are generally horizontal. Means is provided for driving one of said rotatable means for driving said endless belt means in a direction such that the inclined side thereof which faces upward, travels upward from said lower rotatable means to said upper rotatable means. A plurality of lanes of spaced pegs are connected to the outer side of said belt means for carrying piece items from its lower end to its upper end. The lanes of pegs extend along the length of said belt means and are spaced from each other along the width thereof. Roll means is located close to and across the width of said belt means above said upper facing inclined side and disposed such that its axis is generally horizontal. Said roll means has fins or the like extending outward along its length. Means is provided for rotating said roll means in a direction opposite the direction of movement of said upper facing inclined side of said belt means for knocking excess piece items off of said pegs to allow each peg to carry a single piece item to the upper end of said belt means.

In the preferred embodiment, the conveyor means comprises two steeply inclined conveyors, one located in a forward position and the other located in a rearward position. Each conveyor includes endless belt means having a plurality of lanes of spaced pegs driven upward and an oppositely driven finned roller located above each conveyor. The sensors are located at the crest of the rearward conveyor for detectinng individual piece items in each lane thereof. The forward conveyor picks up piece items from a batch load with its lanes of pegs and separates the piece items in each lane. It then deposits the individual piece items on the rearward conveyor which operates to insure complete separation and conveys the separated piece items in each of its lanes past the sensors for detection. Also provided, is a counting compensator for adding additional counts to the counter to compensate for a small amount of miscounting due to several piece items being carried by a peg and sensed and counted as a single item.

DETAILED DESCRIPTION OF THE INVENTION

Figure 1:
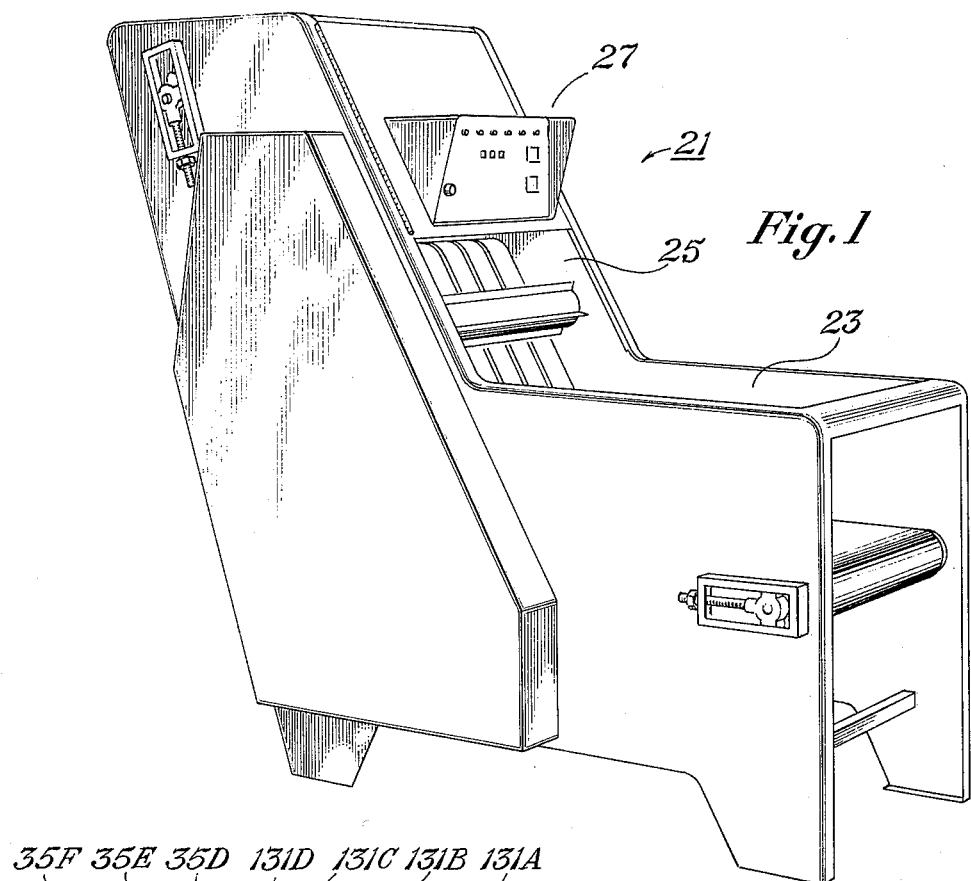
FIG. 1 is a perspective view of the separating and counting apparatus of the present invention.

Referring now to FIG. 1, the separating and counting apparatus of the present invention is identified at 21 and comprises a high speed batch loading apparatus for automatically separating and counting small linen piece items such as shop towels, diapers, napkins, massage towels, etc. The apparatus comprises a batch loading unit or hopper 23 into which a batch or load of piece items may be dumped; a mechanical separator unit 25 for automatically breaking apart the batch of piece items and separating and isolating the piece items for counting by a counting system 27. With this apparatus, a batch of piece items may be loaded and rapidly separated and counted automatically thereby increasing the production output and also eliminating the need of an attendant for separating and counting purposes.

Figure 3:
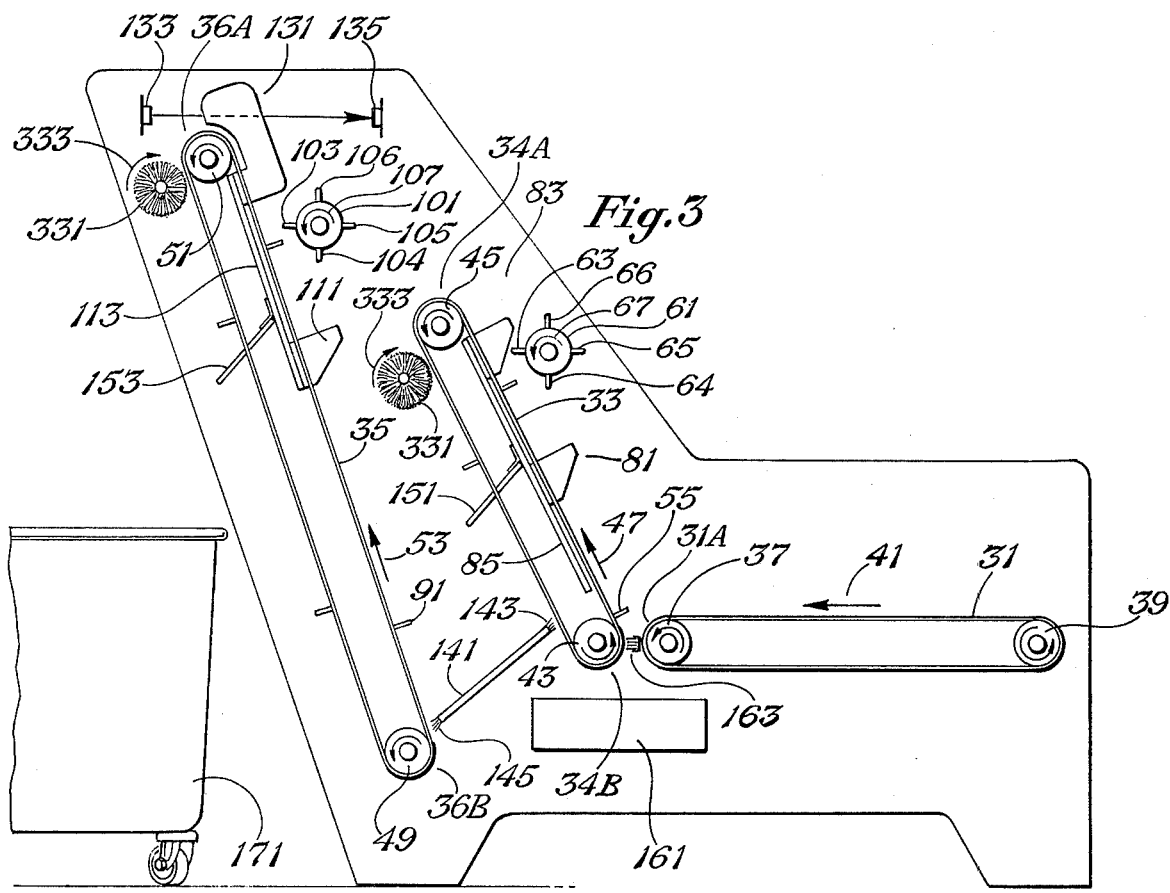
FIG. 3 is a cross-sectional view of the present apparatus showing its loading conveyor, two inclined peg conveyors, and other components.

Referring to FIG. 3, the loading hopper 23 comprises a loading conveyor 31 while the mechanical separator unit comprises a forward steeply inclined conveyor 33 and a rearward steeply inclined conveyor 35. The loading conveyor 31 comprises a solid endless belt supported by rollers 37 and 39 and driven such that its top side moves in the direction of arrow 41 toward the lower end of the inclined conveyor 33. The forward inclined conveyor 33 is supported by rollers 43 and 45 and is driven such that its inclined side which faces upward moves upward in the direction of arrow 47. The rearward inclined conveyor 35 is supported by rollers 49 and 51 and is driven such that its inclined side which faces upward moves upward in the direction of arrow 53. Both conveyors 33 and 35 are inclined generally in the same direction and are in line with each other with the upward facing inclined side of conveyor 35 facing the downward facing inclined side of conveyor 33. Conveyor 35 is longer than conveyor 33 and the conveyors 33 and 35 are supported such that the level of the upper end 34A of conveyor 33 is below the level of the upper end 36A of conveyor 35. Moreover, the lower end 36B of conveyor 35 is nearly directly below the upper end 34A of conveyor 33.

Figure 2:
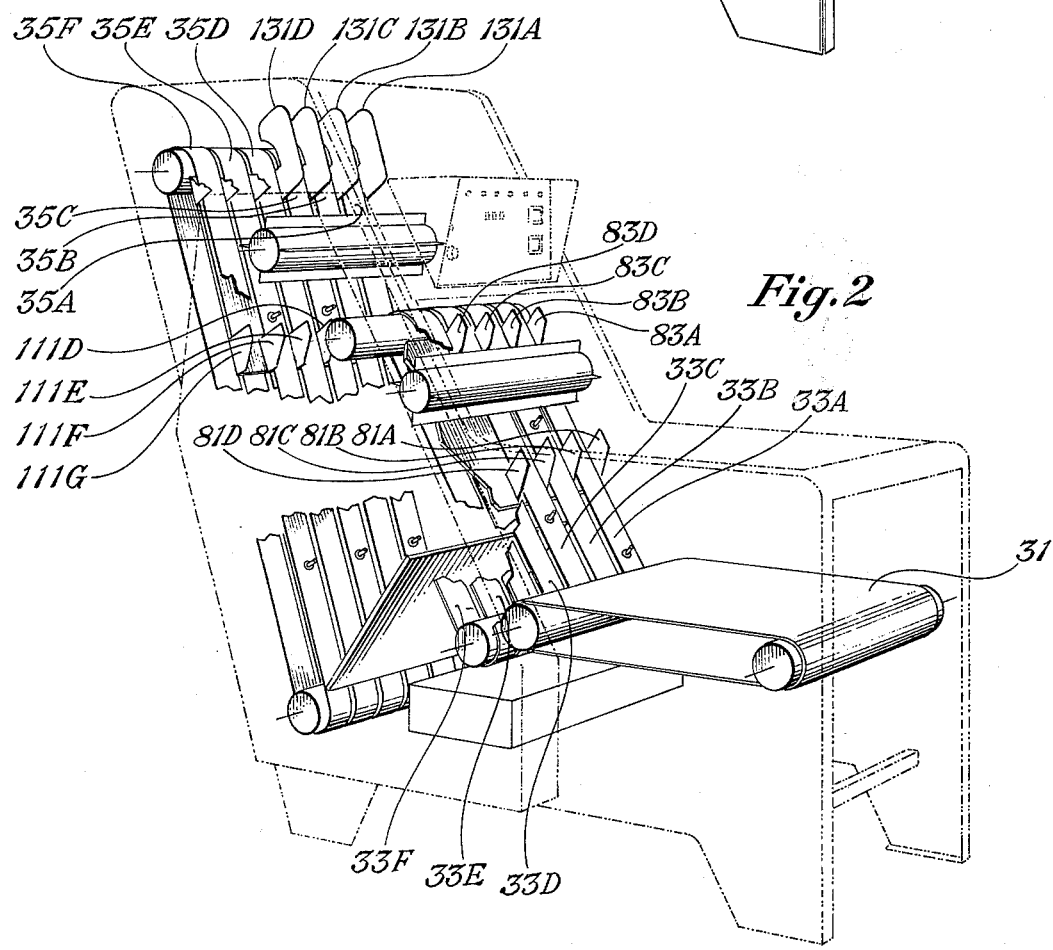
FIG. 2 is a perspective view of the apparatus of FIG. 1 illustrating its internal components.

Referring also to FIG. 2, the forward inclined conveyor 33 comprises a plurality of separate belts defining a plurality of separate channels or lanes. In one embodiment, the conveyor 33 comprises seven separate belts, six of which are shown at 33A–33F in FIG. 2. Each belt has a plurality of outward extending pegs 55 secured to its outer side along its length. In the present embodiment, each belt of conveyor 33 has three equally spaced pegs 55 secured in line at the mid-point of the width of the belt. Thus, the pegs of the belts are located in separate lanes or channels and are employed for picking up cloth items dumped onto the loading conveyor 31 and carrying these piece items upward to the top end or crest 34A of the conveyor 33. From the crest of conveyor 33, the piece items are thrown or fall backwards and are deposited on or picked up by conveyor 35. The distance between the pegs 55 of each of the belts of conveyor 33 is sufficient such that there will be a space between the cloth items in a given lane when carried by the pegs.

Located close to and extending across the width of the conveyor 33 above its upward facing inclined side, is a roll 61 having four radially extending fins 63–66 extending along its length. Although not shown, each fin has a flexible rubber tip secured to its outward end. The roll 61 is rotated in a direction opposite the direction of movement of the inclined upward facing side of the conveyor 33. The direction of rotation of the roll 61 is illustrated by the arrow 67. The purpose of the roll 61 and its fins is to knock off excess piece items which may be attached to the pegs 55 as they travel upward thereby allowing each peg to carry one piece item to the crest of the conveyor 33.

Located on opposite sides of the roll 61 are two rows of fins 81 and 83. Four of the fins or row 81 are identified at 81A–81C while four of the fins of row 83 are identified at 83A–83C. These fins are connected to a plate 85 located and supported within the conveyor 33 and extend outward and upward on each side of the belts of the conveyor 33 thereby separating the belts and hence the lanes from each other. As seen in FIG. 2, the inner fins of rows 81 and 83 extend outward and upward between adjacent pairs of belts. The purpose of the rows of fins 81 and 83 is to aid in maintaining the piece items in separate lanes.

The rearward inclined conveyor 35 also comprises a plurality of separate belts defining a plurality of separate channels or lanes. In the present embodiment, the conveyor 35 comprises seven separate belts, six or which are shown at 35A–35F. Each of these belts is in line with one of the belts of the conveyor 33. Each of the belts of conveyor 35 has a plurality of outward extending pegs 91 secured to its outer side along its length. In the present embodiment, each belt of conveyor 35 has four equally spaced pegs 91 secured in line at the midpoint of the width of the belt. Thus, the pegs 91 of the belts of conveyor 35 are located in separate lanes or channels and are employed for carrying the piece items received from the belts of conveyor 33 upward to the top end or crest 36A of the conveyor 35. The distance between the pegs 91 of each of the belts of conveyor 35 is sufficient such that there will be a space between the cloth items in a given lane when carried by the pegs.

Located close to and extending across the width of the conveyor 35 above its upward facing inclined side is a roll 101 having four radially extending fins 103–106 extending along its length. Although not shown, each fin has a flexible rubber tip secured to its outward end. The roll 101 is rotated in a direction opposite the direction of movement of the inclined upward facing side of the conveyor 35. The direction of rotation or roll 101 is illustrated by arrow 107. The purpose of the roll 101 and its fins is to knock off excess piece items which may be attached to the pegs as they travel upward thereby allowing each peg to carry one piece item to the crest of the conveyor 35.

Located below the roll 101 is a row of fins 111. Four of the fins of row 111 are identified at 111D–111G. These fins are connected to a plate 113 located and supported within the conveyor 35 and extend outward and upward on each side of the belts thereof thereby separating the belts and hence the lanes from each other. As seen in FIG. 2, the inner fins of row 111 extend outward and upward between adjacent pairs of belts. The purpose of the row of fins 111 is to aid in maintaining the piece items in the individual lanes.

Figure 5:
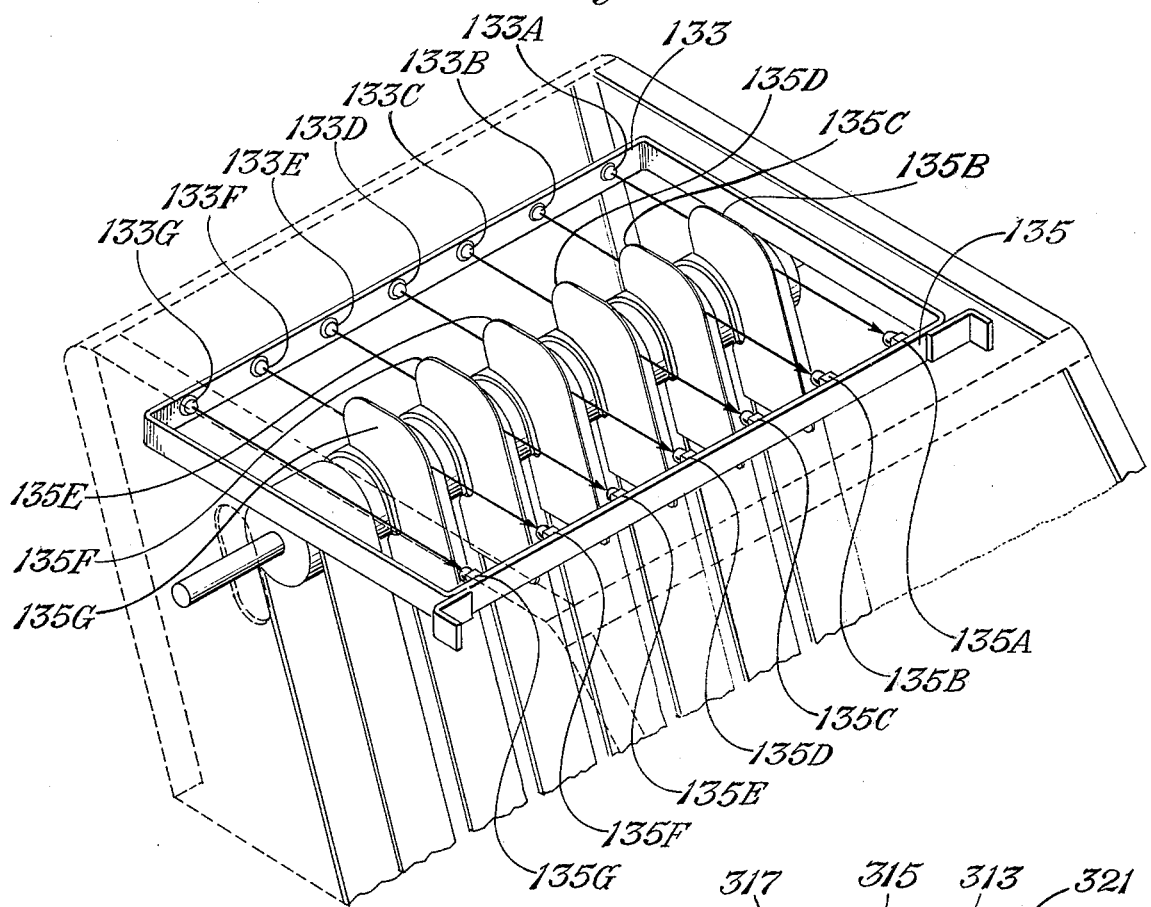
FIG. 5 is a perspective top view of the light source-photocell detecting sensors for sensing the piece items in the separate peg lanes.
Figure 6:
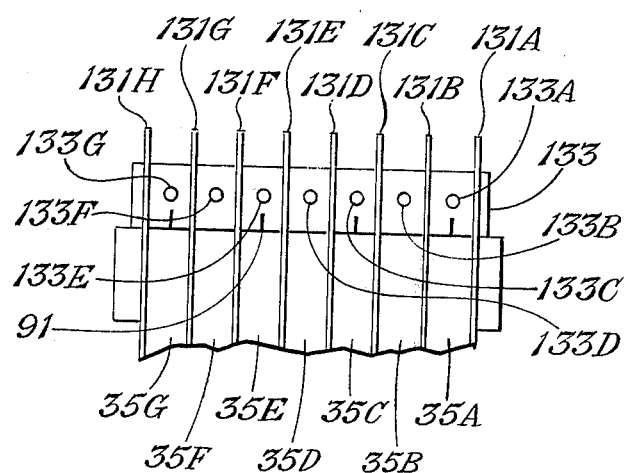
FIG. 6 is a front view of the sources of FIG. 5 as seen through the dividing fins.

Located at the top of the inclined conveyor 35 is a row of lane dividers 131 comprising fins 131A–131H which are connected to the plate 113 and extend upward and outward on each side of the belts of the conveyor 35. As seen in FIGS. 2, 5 and 6, the inner fins of the row 131 extend outward and upward between adjacent pairs of belts. These lane dividers completely separate and isolate the lanes at the crest of the conveyor 35 to insure that a piece item in one lane will not extend across to another lane. Secured to the frame of the apparatus is a frame 133 supporting seven spaced light sources 133A–133G and a frame 135 supporting seven photocells 135A–135G. Each source is located directly across from one of the photocells and is positioned to direct a beam of light over the crest of one of the belts and between the lane dividers located on opposite sides of the belt. The sources are energized continuously while the system is operating such that they will continuously emit light beams to their associated photocells. The light beams are depicted by the arrows in FIGS. 3 and 5. The sources and photocells are located such that the pegs will not interrupt the light beams when the pegs move around the crest of the conveyor 35, however, when a peg carries a piece item around the crest of the conveyor, the piece item will extend above the peg and will interrupt its associated light beam. Each light source-photocell pair thus acts as a sensor for its lane for sensing or detecting individual piece items in each lane as the piece items are carried around the crest of the conveyor 35. The output of each photocell is coupled to a counting system by way of a separate electrical channel. Each channel includes circuitry which produces an electrical pulse when its associated light beam is interrupted by a piece item. The separate channels and counting system will be described subsequently.

Extending between the lower end 36B of the conveyor 35 and the lower end 34B of the conveyor 35 is an inclined slide pan or plate 141. Brushes 143 and 145 are secured to opposite ends of the slide pan 141 to allow the pegs 55 and 91 of conveyors 33 and 35 to pass through their bristles respectively but prevent the piece items from dropping or falling through the space between the ends of the slide plate 141 and the conveyors 33 and 35. Connected to the back sides of plates 85 and 113 are strippers 151 and 153 which comprise small rods extending rearward through the space between adjacent belts 33A-33G and small rods extending rearward through the space between adjacent belts 35A-35G respectively. The purpose of the strippers are to assure freeing of the piece items from the pegs as the pegs are moved downward on the backside of the conveyors and also to serve as guides for the individual conveyor belts. Located below the lower end 34B and the rearward end 31A of the conveyor 33 and the conveyor 31 respectively, is a drawer 161 which catches the debris freed from the piece items by the break apart and tumbling action of the fins 81 and 83 and roll 61. The drawer 161 slides outward for cleaning.

As illustrated in FIG. 3, the rearward end 31A of the loading conveyor is located close to the lower end 34B of the forward conveyor 33 such that the piece items conveyed by the loading conveyor 31 may be picked up by the pegs of the belts of the conveyor 33 as they rotate upward and around the lower roller 43. Located in the space between the conveyors 31 and 33 is a brush 163 having its bristles facing the conveyor 33. The purpose of this brush is to prevent piece items from falling through the space between these conveyors yet allowing the pegs of the conveyors 33 to pass through the bristles thereof.

In operation, the conveyor 31 is driven at a relatively low rate of speed while conveyors 33 and 35 are driven at relatively high rates of speed. In order to separate and count a batch or load of piece items, the batch of piece items will be dumped onto the conveyor 31 which will carry the piece items in a direction of the arrow 41 to the rearward end 31A where there it will be picked up by the pegs of the belts 33A-33G as they move around the roller 43 and upward in the direction of the arrow 47. The steep incline of the conveyor 33 allows gravity to remove excessive piece items from the pegs as they pick up the piece items from the conveyor 31 and travel upward. The conveyor 31 is driven at a relatively low rate of speed to prevent too many piece items from being jambed onto the conveyor 33 at one time. The row of fins 81 breaks apart a congested load of piece items that may be carried upward by the pegs of the belts and also acts to maintain the piece items in separate lanes. The roll 61 knocks excessive piece items off the pegs to obtain one piece item per peg. The row of fins 83 also acts to maintain the piece items in separate lanes. As the piece items are carried upward by the pegs of the belts of the conveyor 33 and as they travel around the crest of the conveyor 33, they are thrown rearward onto the pegs of the belts of the conveyor 35. The purpose of the slide pan 141 is to catch any piece item which may drop directly downward and to direct the piece item toward the conveyor 35. Due to the high rate of speed of the conveyor 33, most of the piece items, however, will be thrown rearward onto the conveyor 35 and will be picked up by its pegs and carried upward. The row of fins 111 aid in maintaining the piece items on the pegs of the belts of conveyor 35 in separate lanes and roller 101 knocks off any excess piece items that may be attached to a given peg. Thus, as the piece items are moved upward and around the crest of the conveyor 35, there will be one piece item per peg which will interrupt the light beam of its associated source for the production of an electrical pulse for counting. The rear end of the frame of the apparatus 21 is open such that as the piece items are moved around the crest of the conveyor 35, they will be thrown rearward into a basket illustrated at 171.

As now can be understood, a batch or load or piece items may be dumped into the hopper 23 onto the loading conveyor 31 which will carry the piece items to the forward inclined conveyor 33. This inclined conveyor will separate and isolate the piece items in its separate lanes. From the crest of the conveyor 33, the individual piece items will be deposited onto the rearward conveyor 35 which is employed to insure complete separation and isolation of the individual piece items in the individual lanes, with one piece item per peg. The individual piece items in the separate lanes of the conveyor 35 will be sensed or detected by the light source-photocell pairs as the piece items travel around the crest of the of conveyor 35 and interrupt the light beams. As now will be described, the outputs of the individual photocells are fed by way of separate channels to circuitry which will store the number of piece items detected in the seven parallel lanes and transfer the counts sequentially or serially to a single output terminal for counting by a single counter to obtain a total count of all of the piece items detected in the seven lanes of the separator unit.

Figure 7:
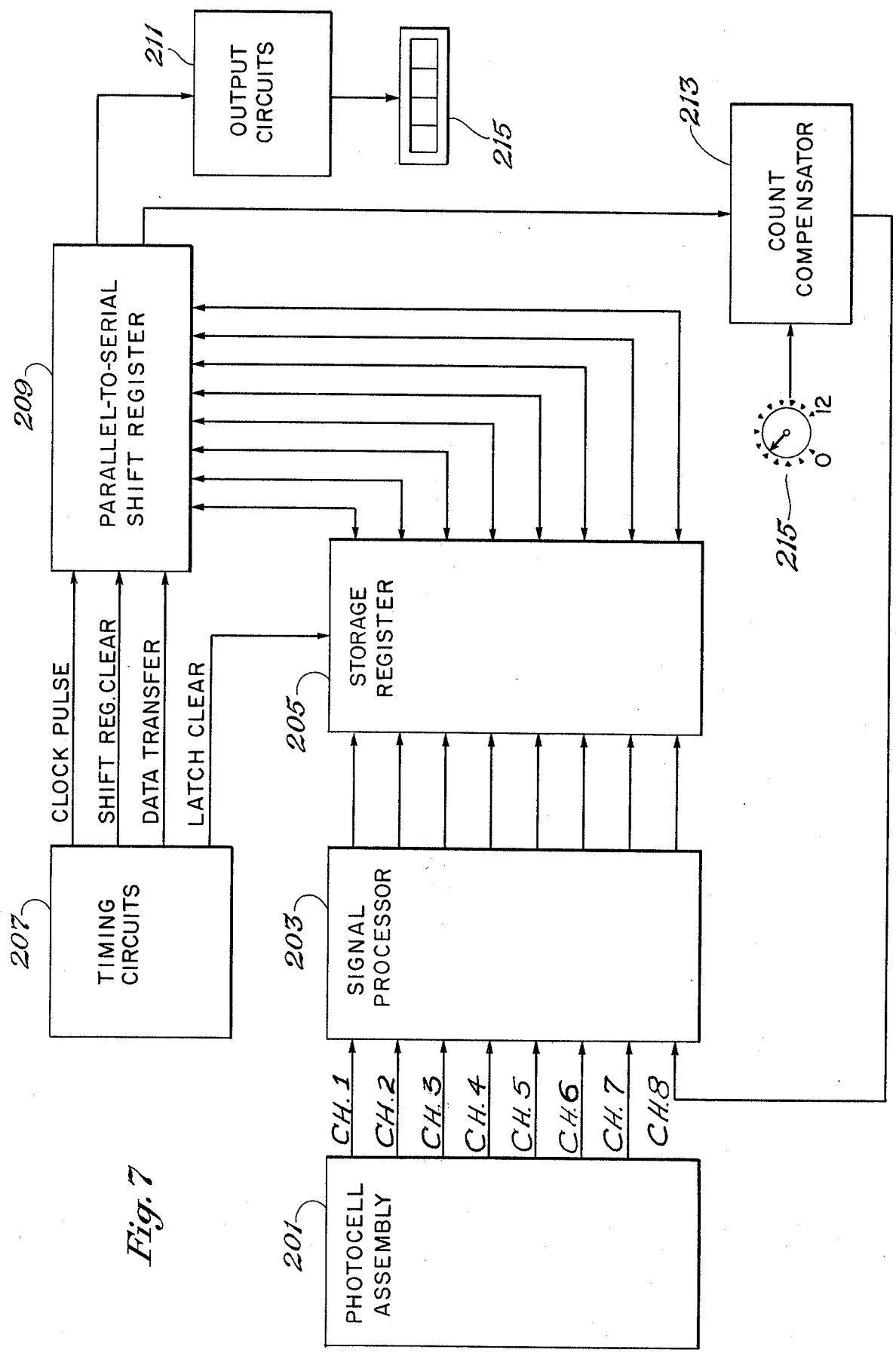
FIG. 7 is a block diagram of the sensing and counting circuitry.

Referring now to FIG. 7, the detecting and counting circuitry can be divided into seven basic components, the photocell assembly 201, a signal processor 203, a storage register 205, timing circuits 207, a parallel-to-serial shift register 209, output circuits 211, and a count compensator 213. The purpose of the units 203, 205, 207, and 209 is to receive, at a multiple of input terminals, electric signals representing events (the passing of piece items past the photocells) which happen randomly and therefore could happen simultaneously, convert them to an equal number of electric signals occurring sequentially, and present them at a single output terminal. The output circuits feed a display 215 which comprises a conventional electromechanical type totalizer display; an electro-mechanical type totalizer printer (not shown); and an electronic type counter-display (not shown). The purpose of the compensator is to compensate for the relatively small number of piece items not counted, which occurs when two piece items are carried by one peg past the sensor thereby resulting in one count rather than two counts. As indicated previously, the photocell assembly consist of two frames mounting seven photocells and seven light sources. Each photocell has a light source directly across from it. The frames are mounted in the machine so that each photocell "looks" across one of the seven belts carrying piece items. The blocking of the light beam to a photocell by a piece item causes an electrical response in the photocell which is sent to the signal processor. In the preferred embodiment, the sources and photocells are located such that the light beams are as close as possible to the pegs 91 of the belts 35A-35G, as the pegs travel around the crest of the conveyor, without being interrupted by the pegs to insure proper detection of the piece items attached to the pegs as they travel around the crest.

Figure 8:
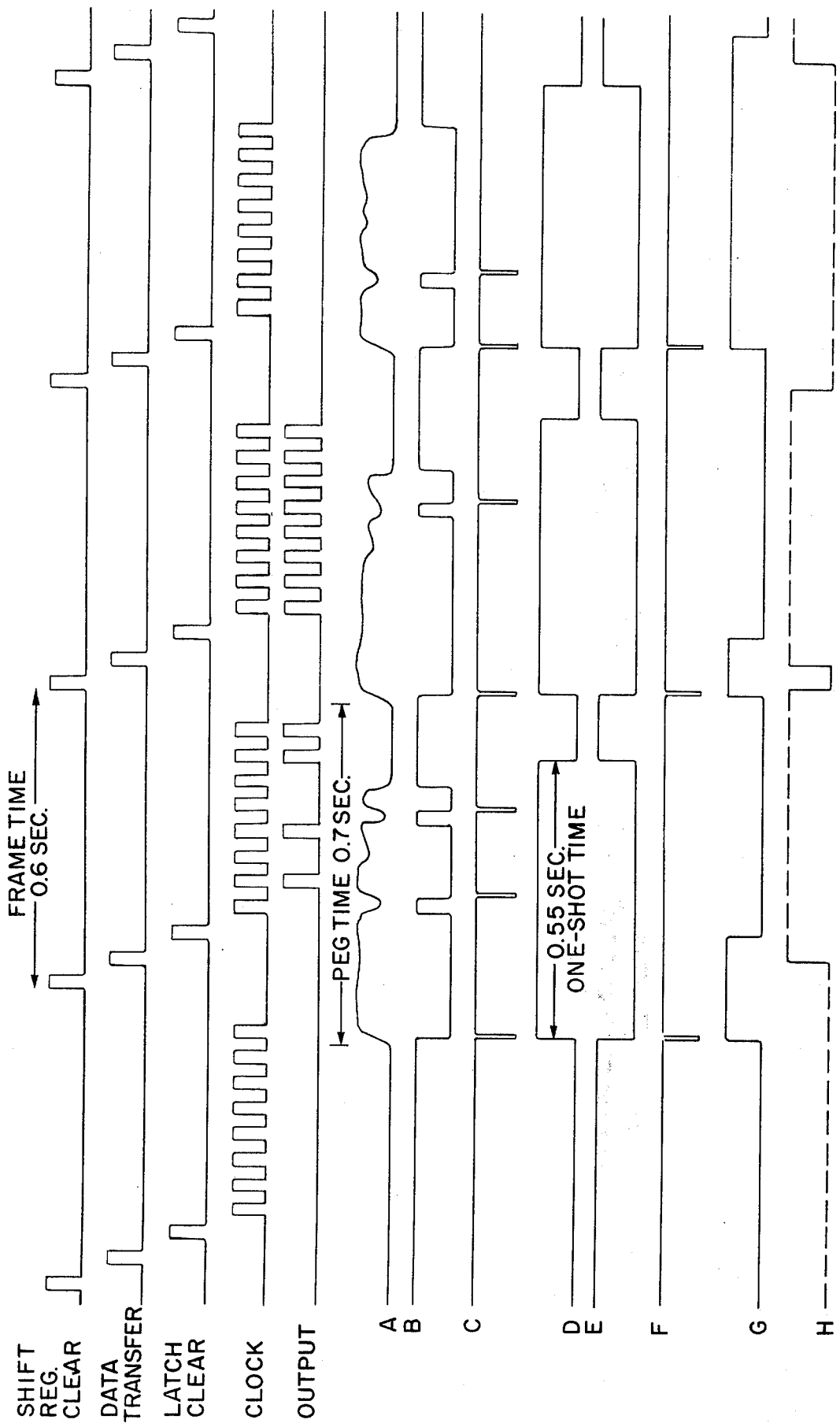
FIG. 8 is a timing diagram useful in understanding the operation of the sensing and counting circuitry.

The timing circuits comprise a free running clock pulse generator, a four stage binary divider or counter, and a decoder to produce the four timing signals illustrated in FIG. 8. These signals are the shift register clear, the data transfer, the latch clear, and the clock pulse. The frame time between the shift register clear signals is determined by the pegs spacing and the belt speed of the machine. The frame time is set about 10 percent less than the time spacing of the pegs. A typical frame time is 0.6 second. The timing sequence for one frame is as follows. The shift register clear pulse removes all previous data from the shift register. The data transfer pulse loads the data stored in the latches into the shift register. The latch clear pulse resets those latches which just had data transferred out. The clock pulse, consisting of eight equally spaced pulses, is used by the shift register to shift out the data just loaded by the data transfer pulse. In operation, pulses are stored in the latches of the storage register during a given frame time and are shifted out of the shift register by the clock pulses of the subsequent frame time. The signals labeled output in FIG. 8 illustrates counts shifted out of the register during the second and third frame times shown.

The signal processor has eight identical channels, one for each of the seven photocells and one for the compensator circuit output. Each channel has a Schmitt trigger amplifier and a one shot circuit. The Schmitt trigger amplifies the signal from the photocell and triggers the one shot. The purpose of the one shot is to inhibit all but the initial voltage change produced by the piece item passing the photocell. Its time period is set for the time required for a piece item to pass the photocell which is less than the peg spacing time. The pulse developed by the initial blocking of the photocell is sent to the storage register.

The storage register contains eight latch circuits, one for each of the eight channels. When a trigger is received by a latch indicating that a piece item has passed by a photocell (or that an extra is to be injected by the compensator), the latch is set and holds this information. After the information is transferred into the shift register by the data transfer pulse, the latch is cleared by the latch clear pulse and is ready to accept data.

The parallel-to-serial shift register has eight stages. Each time the data transfer pulse occurs, the information stored by the latches is parallel loaded into the shift register. The clock pulses then shift this information to the output. Therefore, for each bit of information stored, a pulse will be developed at the shift register output but in sequence and at a rate determined by the clock pulse rate. The output is sent to the output circuits and to the count compensator.

The output circuit amplifies the pulse train from the shift register to a power level suitable to drive the electro-mechanical totalizer display and any of the alternate displays.

The count compensator consists of the two decade counters, two decoders, and a front panel selector switch. It receives a train of impulses from the shift register, counts these and produces an output after a particular number of piece items have been counted, depending upon the setting of the percentage compensation switch 215. For example, if the switch were set at 4 percent, one output pulse would occur for every 25 piece items counted; for 5 percent, one every 20 counted, etc. The dial is marked from 0 to 12 percent in 1 percent increments. The input to the count compensator is taken from a point on the shift register before the compensator pulse of channel 8 is injected. Therefore, it only counts piece items and not piece items plus its own input.

Figure 9:
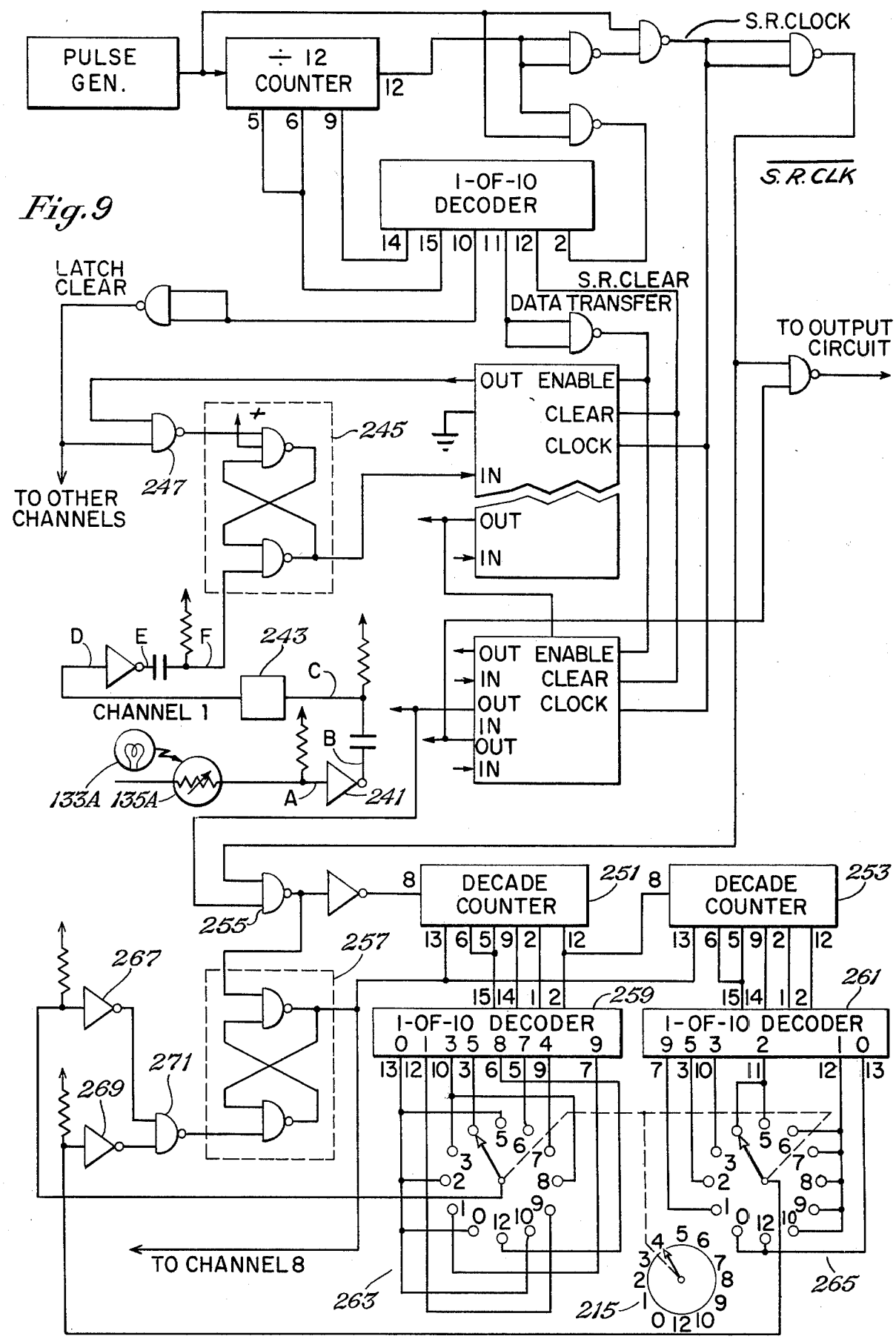
FIG. 9 is a block diagram of a portion of the counting circuitry.

FIG. 9 illustrates a single electrical channel leading from one of the photocells to one parallel input of the shift register while FIGS. 8A–8H illustrate the various outputs which may occur at different positions along the channel shown in FIG. 9. For purposes of identification, the channel is identified as channel 1. The other seven channels will be identical except that in channel 8, the input to the channel will be from the count compensator rather than from a photocell. The signals of FIGS. 8A–8H have the same time relationship as the first four lines of signals of FIG. 8. FIG. 8A illustrates the output of the photocell 135A which may be produced at point A in FIG. 9 as piece items in the associated lane of the conveyor 35 pass between the light source 133A and the photocell 135A and hence interrupt the light beam. The Schmitt trigger amplifier of the electrical channel is identified at 241 and its output is shown in FIG. 8B. The one shot is illustrated at 243 and its input is shown in FIG. 8C while its output is shown in FIG. 8D. The one shot 243 produces a positive output for 0.55 seconds initiated by the leading edge of a piece item passing the photocell. This output is applied to an inverter 245 whose output is shown in FIG. 8E. The latch for this channel is identified at 243 and its input is shown at FIG. 8F while its output is shown at FIG. 8G. This output then is applied to the channel 1 input of the shift register. The latch 245 is set by the negative trigger at F and its output at G stays positive until reset by the latch clear input. The shift register also has a feedback output illustrated at FIG. 8H. When positive, this feedback output indicates that data has been transferred from the latch to the shift register. The feedback output is applied to a gate 247 whose output is coupled to the latch 245. The clear latch signal also is applied to the gate 247. this gate allows the next latch clear to reset the latch after the data at point G has been transferred to the shift register. The shift register feedback must be high during the latch clear pulse in order to reset the latch.

Referring to FIG. 9, the count compensator 213 comprises two decade counters 251 and 253. The output of the seventh channel of the shift register is coupled to decade counter 251 by way of a gate 255 which has another input fed by negative clock signals. The output of gate 255 also is applied to a latch 257 whose output normally is high. Each of the decade counters 251 and 253 produce four binary outputs which are applied to two one-of-ten decoders 259 and 261 respectively. The outputs of the decoders are coupled to the terminals of two rotary switches 263 and 265 whose rotating elements are controlled by the dial 215. The rotating elements of switches 263 and 265 are coupled to two inverters 267 and 269 whose outputs are coupled to a gate 271. The three units 267, 269, and 271 form a negative logic AND gate. The output of gate 271 is coupled to latch 257 whose output is coupled to channel 8 and to the reset pins of the decade counters 251 and 253. In operation, the dial 215 will be set to a certain number to move the rotating elements of switches 263 and 265 to corresponding terminals. The decoders 259 and 261 decode the binary outputs applied from decade counters 251 and 253. Normally, the outputs of decoders 259 and 261 will be positive, however, in the decoding process, one of the outputs of each of decoders 259 and 261 will go negative. When both of the terminals to which the rotating elements of switches 263 and 265 are connected, go negative, the output of gate 271 will go negative, thereby resulting in the output of latch 257 going negative. The negative output of latch 257 is applied to channel 8 and to the reset pins of the decade counters 251 and 253 to reset these counters. The next clock pulse will reset the latch 271 to its normal high state.

In one embodiment, the decade counters 251 and 253 are identified as No. 8280 while the decade counter of the timing circuit is identified as 8288. The three one-of-ten decoders of FIG. 8 are identified as 9301. The shift register is formed of two units identified as 7496. These number identifications are well known in the industry. In the shift register, five channels are connected to the first unit while the last three channels are connected to the second unit.

Figure 4:
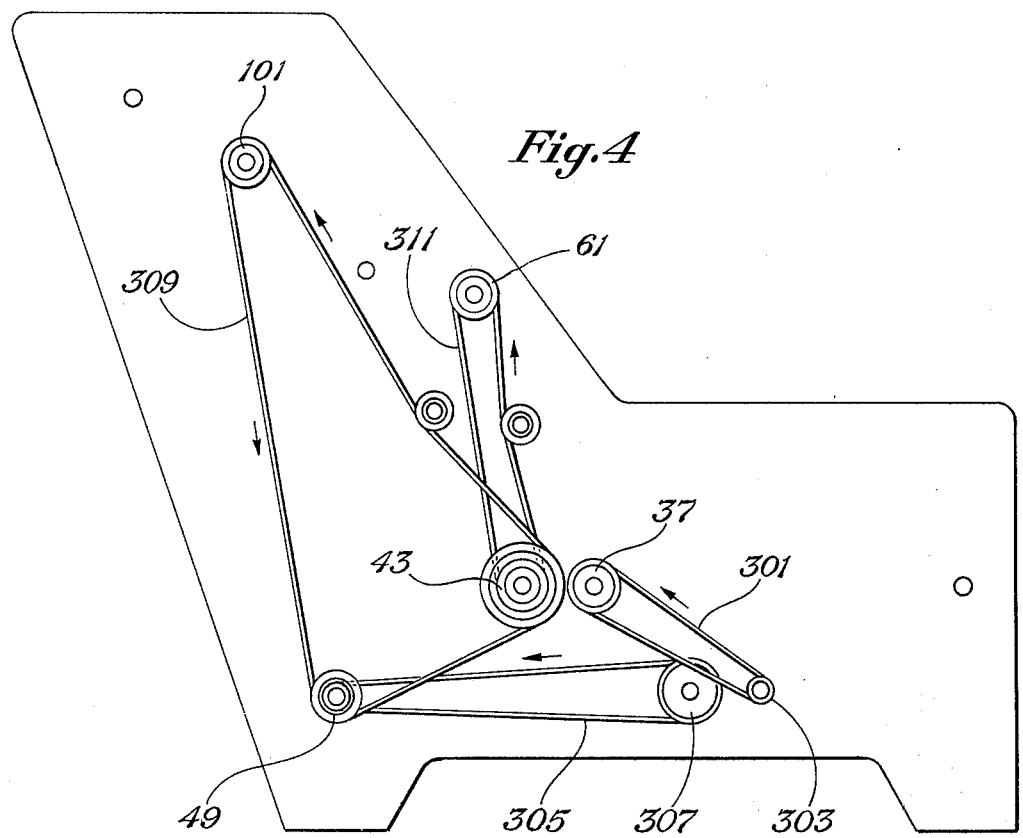
FIG. 4 is a side view of the present apparatus illustrating its drive mechanism.

Referring now to FIG. 4, there will be described the drive mechanism for the apparatus of FIGS. 1–3. The roller 37 of the conveyor 31 is driven by a belt 301 and a small motor 303. The roller 49 of the conveyor 35 is driven by a chain drive 305 and a motor 307. A belt 309 extends around a pulley connected to roller 49, a pulley connected to roller 43, and a pulley connected to a roller 101 for driving the conveyors 33 and 35 in the direction of the arrows 53 and 47 respectively and for driving the roller 101 in the direction of the arrow 107. Extending around another pulley which is connected to roller 43 is another belt 311 which also extends around a pulley connected to roll 61 for driving the roll 61 in the direction of the arrow 67.

In one embodiment, for use for separating and counting shop towels having measurements of 18 × 30 inches, each of the belts 33A–33G have a circumference of 72 inches with three equally spaced pegs connected along the length of each belt. Each of the belts 35A–35G have a circumference of 122 inches with four equally spaced pegs connected along the length of each of the belts. Generally, when loaded as a batch into the present machine, the shop towels or other items will be wadded up rather than extended thereby resulting in a space between adjacent towels when carried by the pegs of the belts. Each of belts 33A–33G and 35A–35G are four inches wide. The pegs of the belts 33A–33G have a length of one inch while the pegs of belts 35A–35G have a length of two inches. The pegs of the belts 33A–33G are shorter to enhance the occurrence of one piece item per peg. The pegs in adjacent lanes of the belts 33A–33G and the pegs in adjacent lanes of the belts 35A–35G are staggered from each other to minimize jambing of piece items between the dividers 81 and 111 as the belts, and hence their pegs travel upward. The distance between the tips of the fins 63–66 of roll 61 and the pegs 55 is about ⅛ of an inch in the embodiment employed for separting shop towels. A similar distance exits between the tips of the fins 103–106 and the pegs 91. For different size towels or piece items, the distance between the pegs on each belt will be different, as well as the distance between the pegs 91 on each of the belts 35A–35G. Similarly, the distance between the pegs 55 and the fins of the roll 61 and the distance between the pegs 91 and the fins of the roll 101 will be different. The conveyor 31 is driven at a rate of about 20 feet per minute while the conveyors 33 and 35 are driven at a rate of about 150 feet per minute. The angle of incline of the conveyor 33 from the horizontal is about 70° while the angle of incline of the conveyor 35 from the horizontal is about 75°.

As mentioned previously, the purpose of the rear conveyor 35 is to insure as complete separation of the piece items as possible. It is to be understood that this conveyor may be eliminated and the lane dividers 131A–131H and the light source-photocell pairs may be located at the crest of the inclined conveyor 33 for detecting the individual piece items carried around the crest of the conveyor 33. In this alternative embodiment, the accuracy in separation and counting will be somewhat reduced than by the use of both conveyors 33 and 35 with the sensors or detectors located at the crest of the rear conveyor 35. In a further alternative, the upper row of fins 83 may be eliminated. In addition, the conveyor 33 may be formed as a solid belt with its pegs 55 secured in seven separate lanes similar to the lanes disclosed in the embodiment of FIG. 2. In this alternative embodiment, the row of fins 81 and 83 (if employed) will be hung from the frame of the apparatus. The use of a solid belt for the conveyor 33 has advantages in that it prevents debris from falling between the separate belts and also insures that the pegs in the various lanes will stay fixed relative to each other. Although in the embodiment disclosed, each of the conveyors 33 and 35 have seven peg lanes, it is to be understood that the conveyors 33 and 35 may have more peg lanes or less. The number of source-photocell pairs and electrical channels will be varied accordingly.

Figure 10:
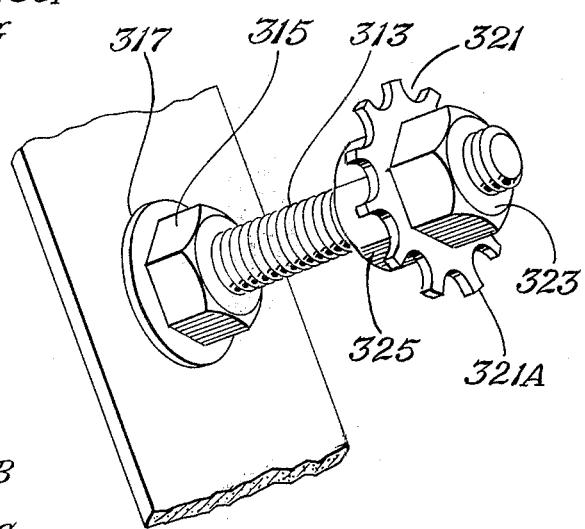
FIG. 10 illustrates a peg which may be employed in the apparatus of the present invention.

Referring now to FIG. 10, there will be described the pegs of FIG. 2 and 3 and an alternative peg. The pegs 55 and 91 comprise bolts 313 connected to their belts by way of nuts 315 and washers 317 located on opposite sides of the belt. The bolts employed for the pegs 55 and 91 have no attachments to their outer ends or tips and the threads of the bolts provide a gripping surface. In order to obtain a greater gripping action, there may be employed a washer 321 having a plurality of pointed ends 321A extending outward thereof and which is secured to the outer tip of the bolt 313 by nuts 323 and 325. Since the washer 321 has a plurality of pointed ends 321A, orientation of the bolt is not material. In this respect, in the event that the bolt rotates about its axis due to vibration, some of the pointed ends always will be pointed in a direction to effectively latch onto and pick up a piece item. The grabbing action of the peg employing the washer 321 is sufficiently great that an additional stripping mechanism is needed on the backside of the conveyors 33 and 35 to insure removal of the piece items from the pegs. Such strippers are illustrated at 331 in FIG. 3 and comprises brushes which are rotated at a high speed in the direction of the arrow 333 to remove the piece items from the pegs. Alternative strippers such as an air blast mechanisms or conveyors driven downward on the backside of the conveyors 33 and 35 may be employed for stripping purposes. The back side conveyors will have smooth pegs and will be driven at a rate greater than the rates at which conveyors 33 and 35 are driven.

Although the present application describes the sensors employed as being light source-photocel pairs, it is to be understood that different types of sensors may be used to detect the passing of the piece items over the crest of the conveyor 35. Moreover, instead of brushes 143, 145, and 163 being used, other types of flexible material such as strips of rubber may be employed to allow the pegs of the conveyors to freely rotate but to prevent piece items from dropping through the space between the conveyors 33 and 35 and plate 141 and between the conveyors 31 and 33.

I claim:

1. Apparatus for separating and counting cloth piece tiems comprising:
   means for receiving a load of piece items,
   separating means for separating the load of piece items, said separating means comprising:

a steeply inclined conveyor comprising endless belt means supported to travel around upper and lower spaced rotatable means disposed such that their axes are generally horizontal, means for driving one of said rotatable means for driving said endless belt means in a direction such that the inclined side thereof which faces upward, travels upward from said lower rotatable means to said upper rotatable means, a plurality of lanes of spaced pegs connected to the outer side of said belt means for carrying piece items from its lower end to its upper end, said lanes of pegs extending along the length of said belt means and being spaced from each other along the width thereof, a separate sensing means for each lane for sensing the presence of a piece item carried by each of said pegs of each of said lanes as they are moved by said belt means past each of said sensing means, and counting means coupled to each of said sensing means for counting the total number of piece items sensed by all of said sensing means.

2. The apparatus of claim 1 comprising:

variable means coupled to said counting means for adding additional counts to said counting means to compensate for miscounting due to several piece items being carried by a peg and sensed and counted as a single item.

3. Apparatus for separating and conveying cloth piece items comprising:

a steeply inclined conveyor comprising endless belt means supported to travel around upper and lower spaced rotatable means disposed such that their axes are generally horizontal, means for driving one of said rotatable means for driving said endless belt means in a direction such that the inclined side thereof, which faces upward, travels upward from said lower rotatable means to said upper rotatable means, a plurality of lanes of spaced pegs connected to the outer side of said belt means for carrying piece items from its lower end to its upper end, said lanes of pegs extending along the length of said belt means and being spaced from each other along the width thereof, roll means located close to and across the width of said belt means above said upward facing inclined side and disposed such that its axis is generally horizontal, said roll means having fin means extending outward along its length, means for rotating said roll means in a direction opposite the direction of movement of said upward facing inclined side of said belt means for knocking excess piece items off of said pegs to allow each peg to carry a single piece item to the upper end of said belt means, lane dividers located at the top end of said belt means for separating said lanes of pegs from each other, and a separating sensing means for each lane located to sense the presence of a piece item carried by each of said pegs of each of said lanes as they travel over said top end of said belt means and between said lane dividers.

4. The apparatus of claim 3 comprising:

counting means coupled to each of said sensing means for counting the total number of piece items sensed by all of said sensing means.

5. Apparatus for separating and conveying cloth piece items comprising:

a steeply inclined conveyor comprising endless belt means supported to travel around upper and lower spaced rotatable means disposed such that their axes are generally horizontal, means for driving one of said rotatable means for driving said endless belt means in a direction such that the inclined side thereof, which faces upward, travels upward from said lower rotatable means to said upper rotatable means, a plurality of lanes of spaced pegs connected to the outer side of said belt means for carrying piece items from its lower end to its upper end, said lanes of pegs extending along the length of said belt means and being spaced from each other along the width thereof, roll means located close to and across the width of said belt means above said upward facing inclined side and disposed such that its axis is generally horizontal, said roll means having fin means extending outward along its length, means for rotating said roll means in a direction opposite the direction of movement of said upward facing inclined side of said belt means for knocking excess piece items off of said pegs to allow each peg to carry a single piece item to the upper end of said belt means, a generally horizontal loading conveyor for receiving piece items for conveyance to said inclined conveyor to allow the piece items to be picked up by said pegs and carried upward, said loading conveyor comprising an endless belt means supported to travel around first and second rotatable means disposed such that their axes are generally horizontal, said first and second rotatable means defining first and second ends respectively of said loading conveyor, said first end of said loading conveyor being located close to the lower end of said inclined conveyor and in line with said upward facing inclined side of said belt means, and means for driving one of said first or second rotatable means for driving said endless belt means of said loading conveyor in a direction such that the top side thereof travels toward the first end of said loading conveyor and hence toward the lower end of said inclined conveyor, the distance between said first end of said loading conveyor and the lower end of said inclined conveyor being sufficient to allow said pegs of said belt means to pass by said first end of said loading conveyor and to pick up piece items conveyed to its first end.

6. The apparatus of claim 5 comprising:

brush means located in the space between said first end of said loading conveyor and said belt means of said inclined conveyor and positioned to allow said pegs to pass through its bristles.

7. The apparatus of claim 6 comprising:

a row of fins or the like extending upward from said upward facing inclined side of said belt means and located below said roll means and above said first end of said loading conveyor for separating said lanes of pegs from each other to aid in separating the piece items from each other.

8. Apparatus for separating cloth piece items comprising:
   means for receiving a load of piece item,
   separating means for separating the load of piece items,
   said separating means comprising:
      a steeply inclined conveyor comprising endless belt means supported to travel around upper and lower spaced rotatable means disposed such that their axes are generally horizontal,
      means for driving one of said rotatable means for driving said endless belt means in a direction such that the inclined side thereof which faces upward, travels upward from said lower rotatable means to said upper rotatable means,
      said lower end of said inclined conveyor being located close to said load receiving means,
      a plurality of lanes of spaced pegs connected to the outer side of said belt means for picking up piece items from said load receiving means, and for carrying the piece items from the lower end to the upper end of said belt means,
      said lanes of pegs extending along the length of said belt means and being spaced from each other along the width thereof,
      roll means located close to and across the width of said belt means above said upward facing inclined side and disposed such that its axis is generally horizontal,
      said roll means having fin means extending outward along its length,
      means for rotating said roll means in a direction opposite the direction of movement of said upward facing inclined side of said belt means for knocking excess piece items off of said pegs to allow each peg to carry a single piece item to the upper end of said belt means and
      a row of fin means extending upward from said upward facing inclined side of said belt means and located below said roll means and above said load receiving means for separating said lanes of pegs from each other to aid in separating the piece items from each other.

9. Apparatus for separating and counting cloth piece items comprising:
   a first inclined conveyor comprising first endless belt means supported to travel around a first pair of upper and lower spaced rotatable means disposed such that their axes are generally horizontal,
   a second inclined conveyor comprising second endless belt means supported to travel around a second pair of upper and lower spaced rotatable means disposed such that their axes are generally horizontal,
   means for driving one of the rotatable means of each pair of rotatable means for moving both of said endless belt means in directions such that the inclined sides thereof which face upward travel upward from their lower rotatable means to their upper rotatable means,
   each belt means having a plurality of lanes of spaced pegs connected to the outer sides thereof for carrying piece items from their lower ends to their upper ends,
   said lanes of pegs of each belt means extending along the length of each belt means and being spaced from each other along the width thereof,
   both of said inclined conveyors being supported to be in line with each other and to incline generally in the same direction with the upward facing inclined side of said second belt means facing the downward facing inclined side of said first belt means and with the upper rotatable means of said first belt means being located at a level below the level of the upper rotatable means of said second belt means,
   a loading conveyor for receiving towels or the like for conveyance to said first inclined conveyor to allow the towels to be picked up by its pegs and carried upward and around its upper end to be deposited on said second inclined conveyor,
   said loading conveyor comprising an endless belt means supported to travel around first and second rotatable means disposed such that their axes are generally horizontal,
   said first and second rotatable means defining first and second ends respectively of said loading conveyor,
   said first end of said loading conveyor being located close to the lower end of said first inclined conveyor and in line with the upward facing inclined side of said first belt means,
   means for driving one of said first or second rotatable means for driving said endless belt means of said loading conveyor in a direction such that the top side thereof travels toward the first end of said loading conveyor and hence toward the lower end of said first inclined conveyor,
   first and second roll means each having fins or the like extending outward along their lengths,
   said first roll means being located close to and across the width of said first belt means above its upward facing inclined side thereof and disposed such that its axis is generally horizontal,
   said second means being located close to and across the width of said second belt means above its upward facing inclined side thereof and disposed such that its axis is generally horizontal,
   means for rotating said first and second roll means in directions opposite the directions of movement of the upward facing inclined sides of said first and second belt means respectively for knocking excess piece items off of the pegs thereof,
   lane dividers located at the top end of said second belt means for separating the lanes thereof from each other,
   a separate sensing means for each lane of said second belt means located to sense the presence of piece items carried by the pegs of said second belt means as they travel over said top end of said second belt means and between said lane dividers, and
   counting means coupled to each of said sensing means for counting the total number of towels sensed by all of said sensing means.

10. The apparatus of claim 9 wherein:
    each of said pegs comprises:
       a stem extending outward from the outer side of its belt means, and
       an enlarged head attached to the outer end of said stem,
       said enlarged head comprises a circular member extending in a plane generally perpendicular to the plane of said stem and having a plurality of narrowed ends extending outward around the periphery of said circular member, and means located close to the back side of each of said belt means for knocking off piece items attached to said pegs as said belt means travels on the back side in a downward direction.

11. The apparatus of claim 9 wherein:

each of said first and second belt means comprises a plurality of separate and spaced belts supported by said upper and lower rotatable means of said first and second inclined conveyors, each belt having at least one peg connected to its outer side thereof and defining a separate peg lane.

12. The apparatus of claim 11 comprising:

a row of fins or the like extending upward from said upward facing inclined sides of said belt means of said first and second inclined conveyors and located below said first and second roll means for separating said lanes of pegs of each of said belt means from each other to aid in separating the piece items.

13. The apparatus of claim 11 wherein:

each of said pegs comprises:

a stem extending outward from the outer side of its belt means, and an enlarged head attached to the outer end of said stem, said enlarged head comprises a circular member extending in a plane generally perpendicular to the plane of said stem and having a plurality of narrowed ends extending outward around the periphery of said circular member, and means located close to the back side of each of said belt means for knocking off piece items attached to said pegs as said belt means travels on the back side in a downward direction.

* * * * *